H. B. HARTMAN.
DEHYDRATOR.
APPLICATION FILED JAN. 24, 1920.
1,376,691.
Patented May 3, 1921.
2 SHEETS—SHEET 2.
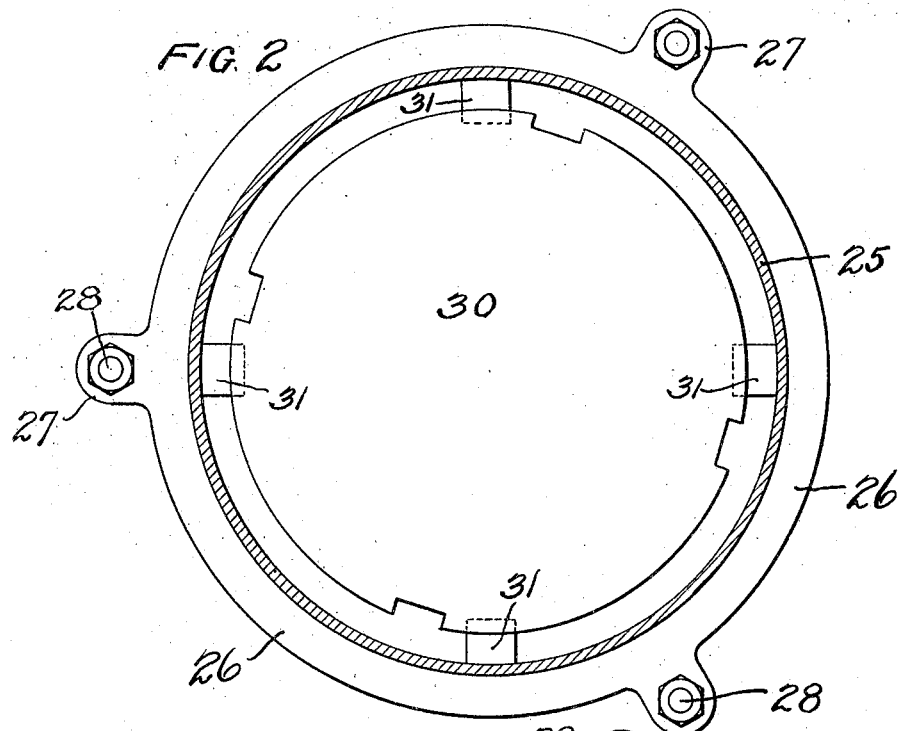
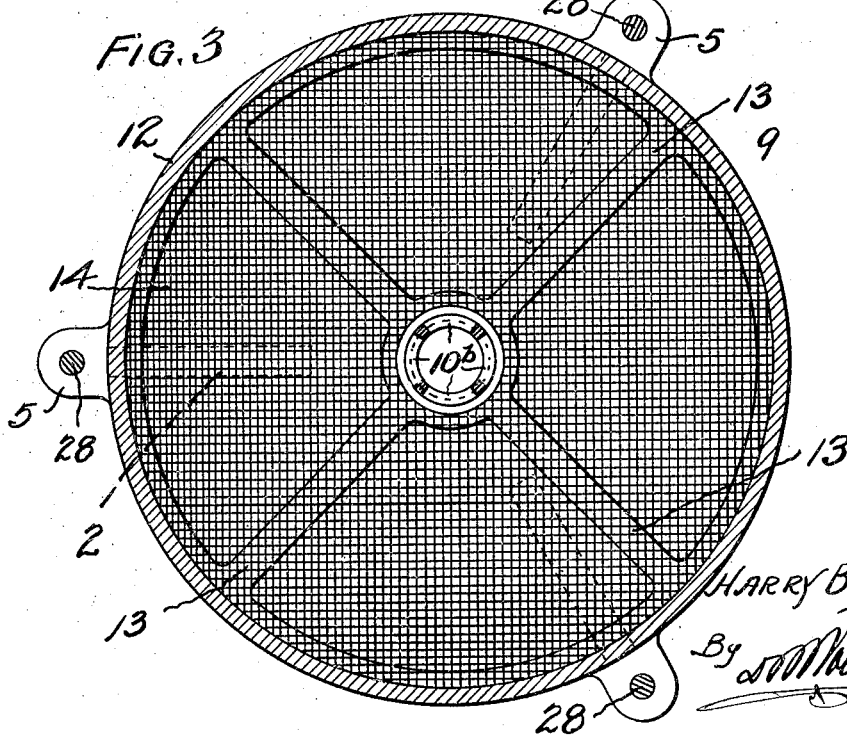
Inventor
HARRY B. HARTMAN
By
Attorney

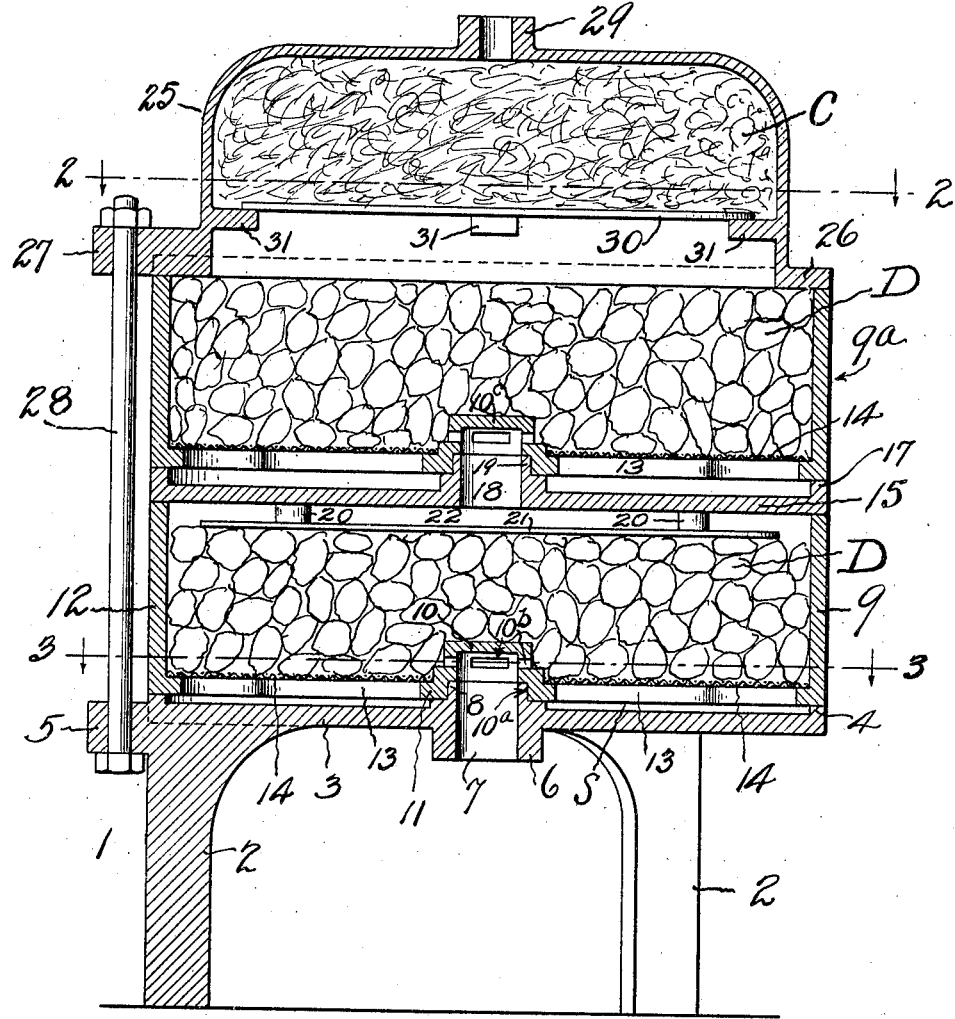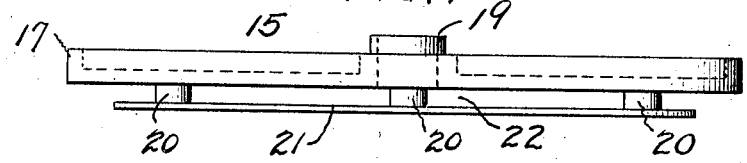

UNITED STATES PATENT OFFICE.

HARRY BUXTAR HARTMAN, OF SCOTTDALE, PENNSYLVANIA, ASSIGNOR TO ELECTRIC WATER STERILIZER AND OZONE COMPANY, OF SCOTTDALE, PENNSYLVANIA, A CORPORATION OF PENNSYLVANIA.

DEHYDRATOR.

1,376,691.    Specification of Letters Patent.    Patented May 3, 1921.

Application filed January 24, 1920. Serial No. 353,859.

*To all whom it may concern:*

Be it known that I, HARRY B. HARTMAN, citizen of the United States, residing at Scottdale, in the county of Westmoreland and State of Pennsylvania, have invented certain new and useful Improvements in Dehydrators, of which the following is a specification.

This invention relates to a novel air drying device or dehydrator especially adapted for use in connection with ozone generators for water purifying apparatus.

In the production of ozone by the action of an electrical current in a generator of the type set forth in my co-pending application Serial No. 353,858 filed Jan. 24, 1920, it is desirable, to obtain the maximum efficiency of the generator, to provide a suitable device for removing the moisture from the air before it is conducted to the ozonizing chamber. Therefore, the present invention aims to meet this need by the provision of a novel device which consists of a plurality of sections or units capable of being utilized in any desired multiple to meet the converting capacity of the ozone generator with which it is used, and to this end it is proposed to provide a simple and practical construction that is susceptible of being readily assembled and taken apart to thereby not only facilitate handling in transportation and installation, but at the same time permitting of the individual drier sections being removed and subjected to a drying heat for driving off the moisture absorbed in operation.

A further object of the invention is to provide a device which will hold a maximum capacity of moisture absorbing material so that the air will be thoroughly dried and at the same time filtered, and thus rendered free from foreign matter which might impede the ozone producing process.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Figure 1 is a vertical sectional view of the improved dehydrator.

Fig. 2 is a horizontal section on the line 2—2 of Fig. 1.

Fig. 3 is another horizontal section on the line 3—3 of Fig. 1.

Fig. 4 is a side elevation of the drip pan.

Similar reference characters designate corresponding parts throughout the several figures of the drawings.

Although the present device is susceptible of being supported or suspended in any convenient manner with reference to the ozone generator, it is preferred to mount the same on a suitable base or stand 1 having the supporting legs 2 while the floor portion 3 thereof is formed with an upstanding peripheral bead or rim 4 and also with the offset bolt receiving ears 5, while the central portion thereof is provided with a tubular boss 6 which provides a main air intake opening 7. The upper collar portion 8 of the said boss projects above the plane of the floor 3 and constitutes an anchor for the superposed drier unit which is preferably in the form of a container or receptacle designated generally as 9. That is to say, the centrally located collar portion 8 on the top surface of the floor 3 of the base is adapted to telescope or interfit with the intake cowl 10 in the central web part of the bottom 11 of the superposed drier unit, whereby the latter may be easily and quickly centered in position on the base and held against displacement by reason of the relative interlocking or interfitting of the collar 8 within the groove 10ª of the cowl 10. This cowl 10 is preferably formed with the lateral air ports or openings 10ᵇ to permit air entering the same to make its way radially toward the sides of the unit and through the drying material D held therein, as will hereinafter more fully appear.

The individual drier units 9 are preferably of duplicate construction to facilitate multiplication to any desired extent, and as will be observed from the drawings each of the same essentially comprises the vertical side wall 12 which is imperforate and forms in effect a continuous tubular casing when one unit is stacked upon the other, while the bottom designated generally as 11 is preferably of the spider formation shown in Fig. 3. That is to say, the bottom 11 of each unit is preferably formed by the radially disposed ribs 13 which constitute a support for a wire gauze 14 or the like for receiving and supporting the drying agent, calcium chlorid, for instance, as shown in Fig. 1. It will therefore be apparent that the bottom 11 of each unit is of foraminous formation to permit of moisture removed or extracted from the air by the drying agent designated generally as D to gravitate to the bottom of the unit where it may be collected in the chamber or space S formed between the underside of the lowermost unit 9 and the floor 3 of the base 1 due to the fact that the outer edge of the lowermost unit rests upon the annular rib 4 on the base.

To provide for receiving the moisture of units arranged above the first unit a novel drip pan 15 is provided. This drip pan 15 is preferably coextensive with the area of the drier units and essentially comprises an imperforate body or plate 16 having the annular peripheral wall 17 and the centrally located opening 18 surrounded by an upstanding collar portion 19, disposed on the same side of the body 1 as the annular peripheral wall 17. On the under side of the plate or body 16 are formed a plurality of baffle carrying studs 20 arranged in spaced relation and adapted to have secured thereto a suitable baffle disk 21 that is of less diameter than the body of the pan and provides an air space 22 between the body of the pan and the upper side of the disk for preventing the drying material D from crowding into the opening 18, and thereby insuring free transmission of air from one unit to the other.

When the drip pan 15 is in position on top of the lowermost unit 9 for instance, it constitutes in effect a lid or cover therefor and all air passing through the ported cowl 10 must pass through the drying material radially in order to make its way to the edge of the disk 21 which is of relatively large diameter, and by reason of its extent provides a comparatively narrow passage adjacent the wall 12 of the drier unit through which the air must pass before it can make its way to the central discharge opening 18 of the drip pan.

The uppermost unit 9ª of the stack is of the same construction as the unit 9 and the ported centrally located cowl 10ᶜ receives the shouldered collar portion of the drip pan which has the effect of centering the unit 9ª with reference to the drip pan and also the unit below in the same manner as the collar 8 on the base with respect to the lower unit 9. The unit 9ª is also filled with drying material of the same nature as the lower unit and moisture eliminated from the air thereby may be collected in the cupped portion of the drip pan and removed when the units are taken down to be dried.

When the desired number of units 9 are stacked upon the base 1 they constitute in effect a tubular casing through which air is drawn in progressive order from the intake opening 7 until it reaches the upper unit, from whence it is led through the cap member 25 that is also adapted to receive and hold a filtering medium such as raw cotton.

As will be observed from the drawings the said cap member 25 is provided with the sealing flange 26 for fitting over the upper edge portion of the uppermost unit and projecting from this flange are suitable bolting ears 27 which are adapted to receive a bolt 28 which may be anchored in the ears 5 of the base 1. When the nuts are tightened up on the tie bolts 28 it will be obvious that the entire device will be held in its assembled and operative condition, with the cap fitted to the stack of drier units and the base supporting the entire superstructure.

Referring more in detail to the cap 25 it is to be observed that the same is provided with the air outlet nipple 29 while the open interior thereof is filled with the cotton filtering medium designated generally as C, the same being supported upon an imperforate baffle plate or disk 30 resting upon the radially offset lugs or ears 31 on the interior face of the cap. By reason of the relatively large diameter of the plate 30 it will be apparent that all of the air leaving the uppermost drier unit 9ª will be compelled to enter the cap from the outer edges thereof, whereby the air will be compelled to pursue a course of maximum length through the cap before making its way to the discharge nipple 29.

In operation the discharge nipple 29 is connected with a pipe leading to the ozone generator, and air enters the opening 7 in the base and thence through the openings 10ª into the calcium chlorid in the lower unit and toward the outer edge of the baffle plate 22 on the drip pan where it will be drawn to the axis of the device and through the opening 18 of the drip pan. When the air reaches the opening 18 in the center of the said pan it will make its way through the calcium chlorid in the unit 9ª in the same manner as it did through the lower unit, and then after the air has been subjected to the drying action of the second unit it will be drawn through the raw cotton or like material confined in the cap 25. In event that the air to be used in the ozone generating process is heavily laden with moisture it will be apparent that more drier units than those shown in the present case may be utilized, and it will of course be understood that it is within the scope of the present invention to multiply these units and drip pans to any desired and required extent.

By reason of the relatively separable character of the entire structure it will be obvious that when the drier units are laden with moisture they may be easily removed and placed where they will be subjected to sufficient drying heat to restore the moisture absorbing properties of the calcium chlorid or other drying medium. This feature of construction is therefore of much practical importance since it permits of maintaining the device at maximum efficiency at a minimum cost, and with little or no trouble.

Without further description it is thought that the features and advantages of the present invention will be readily apparent, and it will of course be understood that changes in the form, proportion and minor details of construction may be resorted to without departing from the spirit of the invention or scope of the appended claims.

I claim:—

1. A dehydrator of the class described, including a tubular body having a plurality of transverse partitions provided with central openings, moisture absorbing means arranged in spaced stratas in the body, and baffle means arranged between a strata of the moisture absorbing means and the opening of each partition, the outer edge of said baffle means extending in relatively close proximity to the wall of the tubular body.

2. A dehydrator device of the class described comprising a supporting base, a cap member, and a plurality of intermediate drier units having foraminous base portions adapted to be arranged in superposed relation, and an imperforate drip pan having a single central opening arranged between said drier units to collect moisture precipitated by the drying agent therein, and means for connecting the cap and base to hold the drier units in place.

3. A dehydrator device of the class described including a base having an intake opening, a cap having means for holding a moisture absorbing medium and provided with a dry air outlet, a plurality of relatively tubular drier units arranged in superposed relation and having foraminous floor portions for supporting a drying medium, a plate having a port arranged between the units to form a cover for the lower unit whereby air may pass therefrom through the port and into the drying medium supported on the foraminous floor portions of the unit, and means for holding the cap and base together to secure the intermediate drier units in position.

4. A dehydrator device of the class described including a base having a floor portion provided with an annular rim and a central upstanding collar, and also provided with a central air intake opening, a drier unit consisting of a foraminous base and imperforate side wall adapted to be superposed on the floor of the base and having a centrally located ported cowl adapted to interfit with the collar on the said base, other drier units superposed on the first mentioned drier unit, a cap for the uppermost drier unit and means for securing the cap and base together to hold the intermediate drier units in position.

5. A dehydrator of the class described including a base having a cupped floor portion and a central opening surrounded by a collar, a tubular baffle unit having a spiderlike base portion covered with foraminous material and also provided with a centrally located ported cowl for nesting on the collar of the base, a drip pan having a relatively cupped body and a central opening surrounded by a collar adapted to constitute a cover for said drier unit, spacing studs carried by the underside of the drip pan, an imperforate baffle disk carried by said studs and terminating short of the outer edges of the drip pan to provide an annular space between the edge of the baffle and the inner wall of the drier unit to permit air to make its way to the central opening of the drip pan, another drier unit having a centrally located slotted dome portion for nesting on the upstanding shouldered collar portion of the drip pan, moisture absorbing means in said drier units, and means for holding the cap and base together.

6. A dehydrator device of the class described including a plurality of individual drier units, each unit consisting of a relatively tubular body having a spider-like bottom including a centrally located ported cowl and radial arm portions, and a screen covering supported on the arms beneath the line of the ports in the cowl.

7. A dehydrator device of the class described including a plurality of drier units of tubular formation and having foraminous bottom portions, and an imperforate drip pan adapted to be interposed between said units, said drip pan having a single central opening and carrying a baffle plate spaced from its under side to provide an unobstructed air space to said central opening of the drip pan.

8. A dehydrator comprising a casing formed of a plurality of drier units containing a moisture absorbing agent, and having an inlet member at the bottom of each unit, and a baffle member arranged beneath the inlet member of the next higher unit.

9. A dehydrator comprising a casing formed of a plurality of drier units adapted to contain a moisture absorbing agent, each unit including a centrally located cowl having ports arranged to discharge air in the absorbing medium at substantially right angles to the direction of gravitation of moisture collected by said absorbing agent.

10. A dehydrator including a drier unit having a foraminous base for supporting a drying medium, a centrally located cowl having ports adapted to direct air radially therefrom through the absorbing agent, means below the foraminous bottom of the unit for collecting moisture absorbed by the drying medium, and baffle means for causing the air to pass through a maximum body of the drying medium, and means for conveying the air from one side of the baffle plate at the axis of the unit.

In testimony whereof I hereunto affix my signature.

HARRY BUXTAR HARTMAN.

In the presence of—

EMORY L. GROFF.